United States Patent Office 2,776,243
Patented Jan. 1, 1957

2,776,243

PROCESS FOR PRODUCTION OF TETRACYCLINE

William Joseph McGhee, Fayetteville, and John Cosimo Megna, Syracuse, N. Y., assignors to Bristol Laboratories Inc., Syracuse, N. Y., a corporation of New York No Drawing. Application March 5, 1956, Serial No. 569,228

6 Claims. (Cl. 195—80)

This invention relates to a method of producing tetracycline by fermentation of microorganisms and, more particularly, to the use of undechlorinated media containing soybean meal, cottonseed endosperm flour, corn oil meal and yeast.

Tetracycline is a broad-spectrum antibiotic which has been described in J. Amer. Chem. Soc. 75, 4621–4623 (1953) in Antibiotics Annual, pages 46–107 (especially p. 54) (1953–1954) and in Annals N. Y. Acad. Sci., 60, 1–82 (1954), where it is noted that fermentation broths of *Streptomyces aureofaciens* contain a mixture of chlortetracycline (Aureomycin) and tetracycline. U. S. Patents 2,482,055 to Duggar, 2,609,329 to Niedercorn and 2,709,672 to Petty disclose numerous media useful for the production of chlortetracycline by fermentation of *Streptomyces aureofaciens*; such of these media as are capable of producing industrially acceptable broths containing at least 1000 mcg./ml., when used with potent strains, are usually found to produce a mixture of antibiotics comprising at least 93% chlortetracycline and no more than 7% tetracycline.

The production of preponderant amounts of tetracycline by the addition of a bromide or the like, e. g. sodium bromide, to such fermentations has been disclosed by Lein and Gourevitch in Belgian Patent 533,886. The production by fermentation of relatively large amounts of tetracycline as compared to the amount of chlortetracycline has been achieved by Minieri et al. by the use of dechlorinated corn steep liquor in a medium which otherwise contains practically no chloride ions, as disclosed in South African application 2253/54 and Belgian Patent 530,983. In the process of Minieri, the most potent broths were obtained only by the use of corn steep liquor which had been dechlorinated in laborious and expensive fashion and in a manner which still gave broths of relatively low potency.

It is the object of the present invention to provide novel and improved media for the production of tetracycline by fermentation of *Streptomyces aureofaciens* or *Streptomyces viridifaciens* which provide increased total amounts of tetracycline and also provide a very high ratio of tetracycline to chlortetracycline, i. e. equal to or greater than nine to one, without the disadvantages in expense, additional labor, increased cycle time, added chemicals, lowered potency and increased difficulty of purification introduced by the use of dechlorinating agents or inhibitors such as bromide ion.

The object of the present invention has been attained and there is now provided by the present invention a process for the production of tetracycline which comprises aerobically growing a culture of a chlortetracycline-producing species of Streptomyces selected from the group consisting of *Streptomyces aureofaciens* and *Streptomyces viridifaciens* in an aqueous carbohydrate solution containing as organic sources of nitrogen from 0.1 to 5.0 percent by weight of soybean meal, from 0.1 to 5.0 percent by weight of substantially oil-free cottonseed endosperm flour, from 0.1 to 5.0 percent by weight of corn oil meal and from 0.1 to 2.0 percent by weight of yeast, said fermentation medium being un-dechlorinated, and said tetracycline in the final fermentation broth comprising greater than 90 percent of the antibiotic activity and being present in the amount of at least 2500 mcg./ml.

Tetracycline is thus prepared by cultivation under said particular, controlled conditions of the chlor-tetracycline producing species of Streptomyces, i. e. *Streptomyces aureofaciens* (NRRL 2209) and *Streptomyces viridifaciens* (ATCC 11989); the latter is described in U. S. Patent 2,712,517. Especially included in the present invention is the use of various strains and natural isolates of these species of Streptomyces as well as mutants produced therefrom by mutating agents such as X-radiation, ultra-violet radiation, nitrogen mustards and similar chemicals, etc.

Other than with respect to the unique combination of organic nitrogen sources of the present invention, the fermentation is carried out using the medium constituents and processes known to be useful in the preparation by submerged aerobic fermentation of other broad spectrum antibiotics such as chlortetracycline and oxytetracycline. Thus, use is made of sugars and glyceride oils as carbon sources, of buffering agents such as calcium carbonate, of inorganic sources of nitrogen such as ammonium sulfate, and of trace amounts of metallic ions such as zinc; no compounds containing chloride ion are used, of course. All of these media constituents, other than the organic nitrogen sources, are virtually chloride-free and available commercially.

In the practice of the present invention, use is made in the medium of from 0.1 to 5.0 percent by weight of soybean meal, and preferably of 0.5 to 3.0 percent. The amount of yeast to be used is about 0.1 to 2.0 percent and preferably about 0.1 to 0.4 percent; any yeast such as *Saccharomyces cerivisiae* or *Torula spp.* may be used and specific examples include debittered brewer's yeast and primary grown baker's yeast. The corn oil meal is used in the amount of 0.1 to 5.0 percent, and preferably from 0.25 to 2.0 percent. Substantially oil-free cottonseed endosperm flour is used in the amount of 0.1 to 5.0 percent, and preferably about 1.0 to 2.0 percent. The cottonseed endosperm flour is available commercially (e. g. as Pharmamedia or Proflo from Traders Oil Mill Co., Fort Worth, Texas) and is prepared by cooking dehulled cottonseeds, extruding at least 95 percent of the oil therein, and collecting by air-settling the endosperm, which is then ground to a flour, i. e. 370 mesh. Thus the phrase "substantially oil-free" refers to the fact that this flour contains less than five percent of the original content of oil of the cottonseed. This cottonseed endosperm flour is an entirely different material than cottonseed meal, which is not as suitable for use in the production of tetracycline because it leads to production of too much chlortetracycline.

The phrase un-dechlorinated medium as used herein refers to a complete medium, or any constituent or mixture of constituents thereof, which have not been subjected to any chemical or physical process which removes chloride ion effectively, either before or after preparation of the final medium. The avoidance of such dechlorinating procedures is one of the most important advantages of the process of the present invention. This process would be of no practical use, however, if the amount of chlortetracycline produced were greater than ten percent of the total antibiotic activity because chlortetracycline and tetracycline are so similar in their chemical and physical properties that it is not commercially practical or possible to prepare acceptably pure tetracycline from mixtures containing more than ten percent chlortetracycline. It is therefore another very important advantage of the process of the present invention that the ratio of tetracycline to chlortetracycline produced thereby is greater than nine to one.

Chloride-free media of the "synthetic" type, i. e. those which use individual, isolated amino-acids or peptides as a source of organic nitrogen, cannot produce broths containing as much as 500 mcg./ml. and are thus of no commercial interest. It is therefore a further advantage of the process of the present invention that it produces final fermentation broths containing at least 2500 mcg./ml. tetracycline.

It is preferred, but not essential, that the inoculum used for the fermentation of the present invention also be grown in an undechlorinated medium of the type used in the final fermentation.

The following examples are provided for purposes of illustration only and are not to be construed as limiting the invention.

*Example I*

Streptomyces aureofaciens was fermented for 100 hours at 85° F., using 74 cubic feet per minute of air, no agitation, lard oil defoamer containing 2% octadecanol and 7.5% mineral oil and 60 gallons of vegetative inoculum, in about 600 gallons of a medium, sterilized 25 minutes at 250° F., containing 6% sucrose, 2% soybean meal, 1.5% cottonseed endosperm flour (Pharmamedia), corn oil meal or dechlorinated corn steep liquor in amounts indicated below, 0.2% brewer's debittered yeast, 0.5% ammonium sulfate, and 1.0% calcium carbonate with the following tabulated results:

| Run Number | Additional Medium Constituents | | Antibiotic Activity in mcg./ml. Tetracycline Hydrochloride Equivalents | Ratio of Tetracycline to Chlortetracycline by Paper Strip Chromatography |
|---|---|---|---|---|
| | Dechlorinated Corn Steep Liquor, Percent | Corn Oil Meal, Percent | | |
| 1 | 1.0 | | 3,441 | 95:5 |
| 2 | 1.0 | | 3,484 | 90:10 |
| 3 | 0.5 | | 3,459 | 94:6 |
| 4 | | 0.25 | 3,125 | 93:7 |
| 5 | | 0.50 | 3,590 | 95:5 |
| 6 | 1.0 | | 3,097 | 95:5 |
| 7 | 1.0 | | 3,209 | 90:10 |
| 8 | | 0.35 | 2,948 | 95:5 |
| 9 | | 0.50 | 2,910 | 95:5 |
| 10 | | 0.65 | 2,855 | 95:5 |
| 11 | | 0.70 | 3,329 | 95:5 |
| 12 | | 0.85 | 3,246 | 93:7 |
| 13 | | 1.0 | 3,078 | 90:10 |
| 14 | | 0.75 | 3,757 | 97:3 |

The media in runs 1–5 inclusive also contained 0.003% zinc sulfate heptahydrate and 0.06% of an iron-sequestering agent (versene, Type Fe–3 specific).

The inoculum in run 14 was prepared in a medium containing no dechlorinated corn steep liquor.

*Example II*

Use of 2.0% cottonseed endosperm flour, no calcium carbonate and 1.0% or 2.0% soybean meal gave from 2700–3325 mcg./ml. of tetracycline equivalents and a tetracycline to chlortetracycline ratio of greater than 90:10 when used with 0.25%, 0.5% or 1.0% corn oil meal in shake flask fermentations containing no corn steep liquor and conducted otherwise according to Exampe I but on a smaller scale and with the aeration supplied by shaking. The other constituents of the medium were 6% sucrose, 0.2% debittered brewer's yeast, 0.5% ammonium sulfate, 0.003% $ZnSO_4 \cdot 7H_2O$ and 0.06% of iron-chelating agent ($Fe^{+++}$ specific Versene).

*Example III*

Use of 2.0% cottonseed endosperm flour, 1.0% calcium carbonate and 1.0% soybean meal gave over 2500 mcg./ml. of tetracycline equivalents and a tetracycline to chlortetracycline ratio of greater than 90:10 when used with 0.5% or 1.0% corn oil meal in shake flask fermen- tations containing no corn steep liquor and conducted otherwise according to Example I but on a smaller scale and with the aeration supplied by shaking. The other constituents of the medium were 6% sucrose, 0.2% debittered brewer's yeast, 0.5% ammonium sulfate, 0.003% $ZnSO_4 \cdot 7H_2O$ and 0.06% of iron chelating agent ($Fe^{+++}$ specific Versene).

*Example IV*

Use of 1.0% cottonseed endosperm flour, no calcium carbonate and 1.0% or 2.0% soybean meal gave from 2805–3100 mcg./ml. tetracycline equivalents and a tetracycline to chlortetracycline ratio of greater than 90:10 when used with 0.25%, 0.50% or 1.0% corn oil meal in shake flask fermentations containing no corn steep liquor and conducted otherwise according to Example I but on a smaller scale and with the aeration supplied by shaking. The other constituents of the medium were 6% sucrose, 0.2% debittered brewer's yeast, 0.5% ammonium sulfate, 0.003% $ZnSO_4 \cdot 7H_2O$ and 0.06 of iron-chelating agent ($Fe^{+++}$ specific Versene).

Extensive experimental work has demonstrated that omission of any one or more of the four organic sources of nitrogen, i. e., cottonseed endosperm flour, soybean meal, corn oil meal or yeast, from these un-dechlorinated media, or substitution of another agent therefor, resulted in either a large reduction in total potency, i. e., well below 2500 mcg./ml., or a decrease below nine to one of the ratio of tetracycline to chlortetracycline.

Mutants and strains of Streptomyces viridifaciens which produce 2500 mcg./ml. chlortetracycline in the media of Niedercorn and Petty can be used with equal effectiveness in place of the Streptomyces aureofaciens in the examples above.

We claim:

1. A process for the production of tetracycline which comprises aerobically growing a culture of a chlortetracycline-producing species of Streptomyces selected from the group consisting of Streptomyces aureofaciens and Streptomyces viridifaciens in an aqueous carbohydrate solution containing as organic sources of nitrogen from 0.1 to 5.0 percent by weight of soybean meal, from 0.1 to 5.0 percent by weight of substantially oil-free cottonseed endosperm flour, from 0.1 to 5.0 percent by weight of corn oil meal and from 0.1 to 2.0 percent by weight of yeast, said fermentation medium being undechlorinated and said tetracycline in the final fermentation broth comprising greater than 90 percent of the antibiotic activity and being present in the amount of at least 2500 mcg./ml.

2. A process for the production of tetracycline which comprises aerobically growing a culture of a chlortetracycline-producing species of Streptomyces selected from the group consisting of Streptomyces aureofaciens and Streptomyces viridifaciens in an aqueous carbohydrate solution containing as organic sources of nitrogen from 0.5 to 3.0 percent by weight of soybean meal, from 1.0 to 2.0 percent by weight of substantially oil-free cottonseed endosperm flour, from 0.25 to 2.0 percent by weight of corn oil meal and from 0.1 to 0.4 percent by weight of yeast, said fermentation medium being un-dechlorinated and said tetracycline in the final fermentation broth comprising greater than 90 percent of the antibiotic activity and being present in the amount of at least 2500 mcg./ml.

3. A process for the production of tetracycline which comprises aerobically growing a culture of Streptomyces aureofaciens in an aqueous carbohydrate solution containing as organic sources of nitrogen from 0.1 to 5.0 percent by weight of soybean meal, from 0.1 to 5.0 percent by weight of substantially oil-free cottonseed endosperm flour, from 0.1 to 5.0 percent by weight of corn oil meal and from 0.1 to 2.0 percent by weight of yeast, said fermentation medium being un-dechlorinated and said tetracycline in the final fermentation broth comprising greater than 90 percent of the antibiotic activity and being present in the amount of at least 2500 mcg./ml.

4. A process for the production of tetracycline which comprises aerobically growing a culture of *Streptomyces aureofaciens* in an aqueous carbohydrate solution containing as organic sources of nitrogen from 0.5 to 3.0 percent by weight of soy bean meal, from 1.0 to 2.0 percent by weight of substantially oil-free cottonseed endosperm flour, from 0.25 to 2.0 percent by weight of corn oil meal and from 0.1 to 0.4 percent by weight of yeast, said fermentation medium being un-dechlorinated and said tetracycline in the final fermentation broth comprising greater than 90 percent of the antibiotic activity and being present in the amount of at least 2500 mcg./ml.

5. A process for the production of tetracycline which comprises aerobically growing a culture of *Streptomyces viridifaciens* in an aqueous carbohydrate solution containing as organic sources of nitrogen from 0.1 to 5.0 percent by weight of soybean meal, from 0.1 to 5.0 percent by weight of substantially oil-free cottonseed endosperm flour, from 0.1 to 5.0 percent by weight of corn oil meal and from 0.1 to 2.0 percent by weight of yeast, said fermentation medium being un-dechlorinated and said tetracycline in the final fermentation broth comprising greater than 90 percent of the antibiotic activity and being present in the amount of at least 2500 mcg./ml.

6. A process for the production of tetracycline which comprises aerobically growing a culture of *Streptomyces viridifaciens* in an aqueous carbohydrate solution containing as organic sources of nitrogen from 0.5 to 3.0 percent by weight of soy bean meal, from 1.0 to 2.0 percent by weight of substantially oil-free cottonseed endosperm flour, from 0.25 to 2.0 percent by weight of corn oil meal and from 0.1 to 0.4 percent by weight of yeast, said fermentation medium being un-dechlorinated and said tetracycline in the final fermentation broth comprising greater than 90 percent of the antibiotic activity and being present in the amount of at least 2500 mcg./ml.

No references cited.